United States Patent [19]

Schoenzeit et al.

[11] Patent Number: 5,625,712
[45] Date of Patent: Apr. 29, 1997

[54] ITERATIVE COMPRESSION OF DIGITAL IMAGES

[75] Inventors: Loren Schoenzeit, Orono; Richard A. Keeney, Eagan; Philip A. Lodwick, Richfield, all of Minn.

[73] Assignee: Management Graphics, Inc., Minneapolis, Minn.

[21] Appl. No.: 355,594

[22] Filed: Dec. 14, 1994

[51] Int. Cl.⁶ ................................................. G06K 9/36
[52] U.S. Cl. ........................ 382/232; 382/239; 348/419
[58] Field of Search ................................. 382/245, 232, 382/239, 240, 235, 166; 395/110, 115, 116, 114; 348/419; 358/430, 261.4

[56] References Cited

U.S. PATENT DOCUMENTS

| | | | |
|---|---|---|---|
| 4,965,754 | 10/1990 | Stansfield et al. | 364/526 |
| 5,040,233 | 8/1991 | Davey et al. | 382/239 |
| 5,109,433 | 4/1992 | Notenboom | 382/240 |
| 5,235,419 | 8/1993 | Krause | 348/416 |
| 5,467,134 | 11/1995 | Laney et al. | 348/415 |
| 5,479,587 | 12/1995 | Campbell et al. | 395/116 |
| 5,483,622 | 1/1996 | Zimmerman et al. | 395/116 |
| 5,553,160 | 9/1996 | Dawson | 382/166 |

*Primary Examiner*—Leo Boudreau
*Assistant Examiner*—Matthew C. Bella
*Attorney, Agent, or Firm*—Barry R. Lipsitz; Ralph F. Hoppin

[57] ABSTRACT

A method and apparatus are provided for compressing image data to enable the storage thereof in a limited amount of memory available in an imaging system. The image data is rasterized into a plurality of scan lines representing at least a portion of an image. Each scan line comprises a sequence of pixels. The scan lines are compressed in a first coding step. A determination is made as to whether the amount of data contained in the compressed plurality of scan lines exceeds the available storage capacity of the memory. If so, the scan lines are further compressed in a second coding step to reduce the amount of data therein. The second coding step can be successively repeated using more tolerant coding thresholds until the amount of data remaining no longer exceeds the available storage capacity of the memory.

9 Claims, 4 Drawing Sheets

ITERATIVE COMPRESSION OF DIGITAL IMAGES

BACKGROUND OF THE INVENTION

The present invention relates to the processing of graphic image files for reproduction by an imaging device such as a color copier, laser printer, image recorder or the like, and more particularly to a method and apparatus for compressing image data to enable the storage thereof in a limited amount of memory provided by an imaging device.

In computer generated image recording, a plurality of computer generated images are rasterized for input to a color copier, laser printer or the like or for exposing corresponding frames of photographic film or another imaging substrate. The copier, printer or film recorder (referred to herein as an "imaging device" or "output device") processes the rasterized image data to provide, e.g., paper copies, transparencies, color slides or motion picture footage containing images represented by the image data.

To obtain the computer generated images, a user first generates a graphic image file using a computer graphics program. The graphic image file may include one or more images or frames of image data which, for example, are in a bit mapped or text (e.g., ASCII) format. The image data are processed by a raster image processor (RIP) which provides frames of raster image data for use by an output device in generating images. The output device may comprise, for example, a color copier, a laser printer, or a photographic film recorder. Film recorders, such as those sold under the Solitaire® and Sapphire® trademarks by Management Graphics, Inc. of Minneapolis, Minn., U.S.A. are well known in the art. Color copiers, such as those manufactured by Xerox Corporation and laser printers, such as those manufactured by Hewlett-Packard Corporation are also well known.

In order to image a picture on an output device, all data (which may be in a compressed or uncompressed form) must fit in the available random access memory (RAM) provided by the interface between the graphics workstation and the output device. Thus, in prior art digital imaging systems, the amount of RAM available determined the maximum complexity of a picture that can be imaged. In order to accommodate complex images, a large amount of RAM was required in the interface. Such RAM is expensive, and can substantially increase the price of an imaging system. Thus, a trade-off between the image complexity that can be handled by a particular imaging system and the system's cost has arisen that has required compromises in the types of images that can be handled by lower cost systems.

The present invention substantially overcomes the disadvantage of lower cost prior art imaging systems that are unable to handle images above a certain complexity. This objective is achieved by compressing and, if necessary, successively recompressing rasterized image data with greater loss until the resultant compressed data is able to fit within a RAM budget.

SUMMARY OF THE INVENTION

In accordance with the present invention, a method is provided for compressing image data to enable the storage thereof in a limited amount of memory available in an imaging system. Image data is rasterized into a plurality of scan lines representing at least a portion of an image. Each scan line comprises a sequence of pixels. The pixels are defined by separate additive or subtractive color components (CMYK or RGB) as well known in the art. The scan lines are compressed in a first coding step. A determination is made as to whether the amount of data contained in the compressed plurality of scan lines exceeds the available storage capacity of the memory. If so, the scan lines are further compressed in a second coding step to reduce the amount of data therein.

The method of the invention can comprise the further steps of ascertaining whether the amount of data remaining after the second coding step still exceeds the available storage capacity of the memory. If so, the second coding step is successively repeated until the amount of data remaining no longer exceeds the available storage capacity of the memory.

In an illustrated embodiment, the second coding step is responsive to a compression threshold that is adjustable to increase the amount of compression and thereby reduce the amount of data obtained during successive repetitions of the second coding step. The second coding step is repeated with more tolerant thresholds until the amount of data remaining no longer exceeds the available storage capacity of the memory.

The first coding step can, for example, run length code the data in each scan line to represent runs of identically colored pixels in an abbreviated form. Such coding provides lossless compression. Since each pixel is defined by three (RGB) or four (CMYK) color components, it is preferable to perform the coding at the level of the individual color components rather than coding on the basis of pixels that are identical in all respects (i.e., have all the same color components). Thus, for example, runs of the red color component "R," the green color component "G," and the blue color component "B" will preferably all be coded independently.

The second coding step can also use run length coding, but in a mode that provides lossy compression. For example, the compression threshold can comprise a color proximity threshold in which different colors having a sufficient degree of similarity are processed as a single color. Prior to the second coding step, the run length coded scan lines to be further compressed are evaluated to locate any instances of two adjacent run length coded different colors that fall within the color proximity threshold with respect to one another. Upon finding such an instance, the two different adjacent colors are run length coded by the second coding step as a single color. Prior to repeating the second coding step, the compression threshold is adjusted to a more tolerant color proximity threshold in which colors that are more different from each other than permitted by the prior value of the threshold will be coded by the second coding step as a single color.

The single color provided for each instance coded by the second coding step can comprise an average of the two adjacent colors. Alternatively, the single color provided for each instance coded by the second coding step can be one of the two adjacent colors.

In a first embodiment, the first coding step provides lossless compression while the second coding step provides lossy compression. Where run length coding is used, the maximum run length of any lossy compression can be limited to control the quality of an image produced by the compressed scan lines, e.g., to reduce horizontal smearing. In an alternate embodiment that is useful for systems having very limited memory, the first and second coding steps can use lossy compression in order to achieve the required amount of compression more quickly.

Apparatus in accordance with the invention compresses image data to enable the storage thereof in a limited amount of memory available in an imaging system. Means are provided for rasterizing the image data into a plurality of scan lines representing an image. Each scan line comprises a sequence of pixels. Encoder means run length code the scan lines to represent runs of identically colored pixel components in an abbreviated form. Means are provided for determining whether the amount of data contained in the run length coded scan lines for the image exceeds the available storage capacity of the memory. Means are responsive to the determining means when the amount of data exceeds the available storage capacity, for evaluating the run length coded scan lines to locate any instances of two different adjacent run length coded colors that are within a first predetermined color proximity threshold with respect to each other. Upon finding such an instance, the two different adjacent colors are run length coded as a single color.

The apparatus of the invention can further comprise means for ascertaining whether the amount of data output for the image, after run length coding adjacent colors within the threshold, still exceeds the available storage capacity of the memory. Means are provided that are responsive to the ascertaining means when the data output exceeds the available storage capacity, for reevaluating the run length coded lines using a more tolerant color proximity threshold, and run length coding adjacent colors based on the more tolerant threshold so that colors that are more different from each other than permitted by the first threshold will be run length coded as a single color. The reevaluating means use successively more tolerant color proximity thresholds in response to the ascertaining means, until the data output for the image no longer exceeds the available storage capacity of the memory.

Apparatus is also provided for compressing image data to enable the storage thereof in a limited amount of memory available in an imaging system, wherein the image data is rasterized into a plurality of scan lines representing at least a portion of an image. Each scan line comprises a sequence of pixels. Means are provided for compressing the scan lines. A determination is made as to whether the amount of data contained in the compressed plurality of scan lines exceeds the available storage capacity of the memory. Means, responsive to the determining means when the compressed plurality of scan lines exceeds the available storage capacity of the memory, further compress the scan lines to reduce the amount of data therein. Means are provided for ascertaining whether the amount of data remaining after the further compressing still exceeds the available storage capacity of the memory. If so, the means responsive to the determining means successively repeats the further compression until the amount of data remaining no longer exceeds the available storage capacity of the memory. The means responsive to the determining means are responsive to a compression threshold that is adjustable to increase the amount of compression and thereby reduce the amount of data obtained during successive compression cycles, until the amount of data remaining no longer exceeds the available storage capacity of the memory.

DETAILED DESCRIPTION OF THE INVENTION

The present invention enables imaging systems that would not otherwise be able to handle a complex image to process such images after compression of the image data. The image data is compressed on an iterative basis until the total amount of data for an image is small enough to be accommodated by the available memory in the imaging system.

Figure 1:
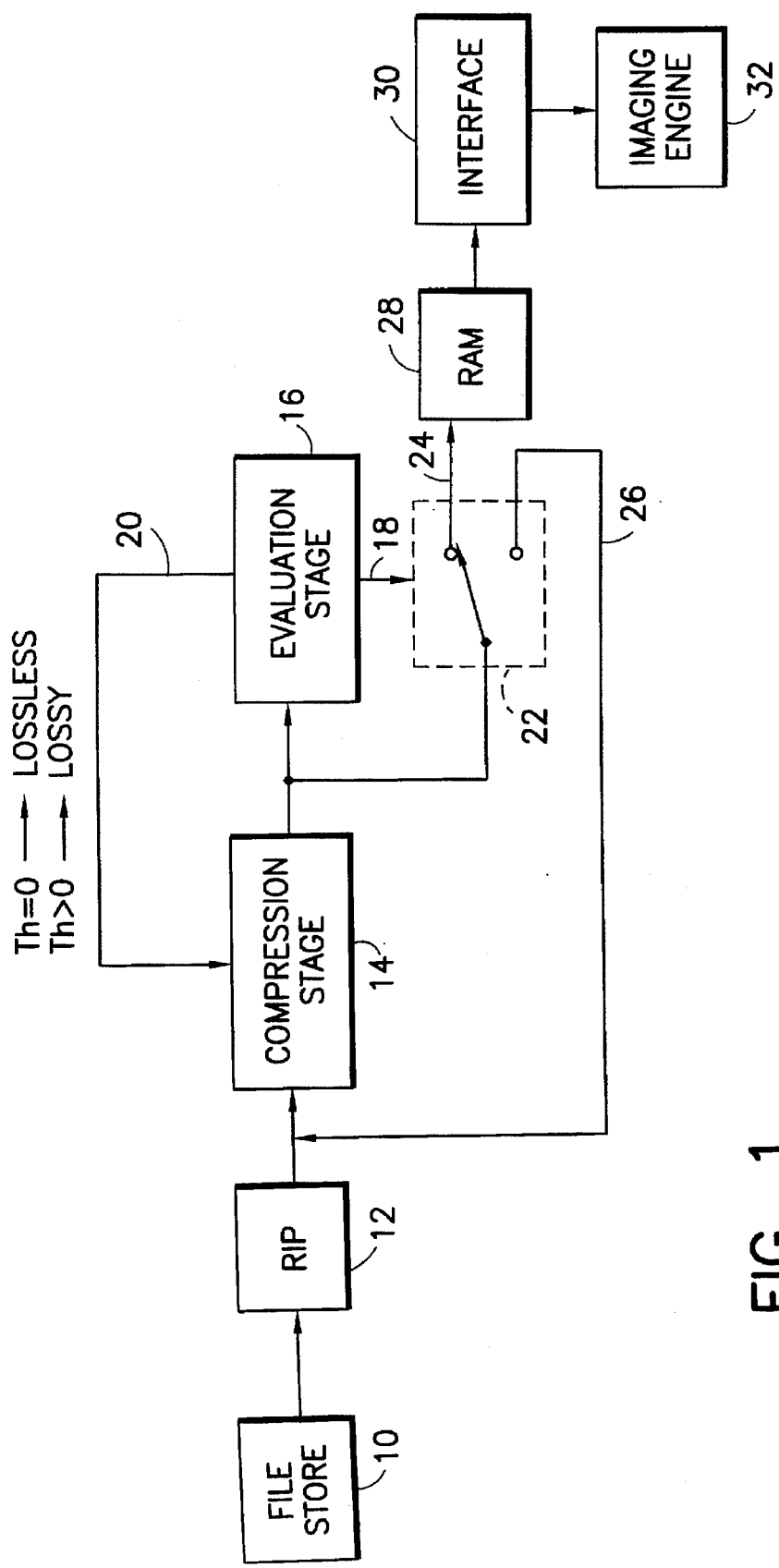
FIG. 1 is a block diagram illustrating an example of hardware that can be used to implement the present invention.

An example of the hardware that can be used to implement the present invention is illustrated in FIG. 1. A graphic image file is stored in a file store 10, which can comprise, for example, magnetic media such as a hard disk. The graphic image file can be in any of several conventional formats. Examples of such formats are PostScript files, TIFF files and Targa files. The graphic image file is rasterized in a conventional raster image processor (RIP) 12. The rasterized data comprises a plurality of scan lines representing at least a portion of an image. Each scan line comprises a sequence of pixels.

After the RIP 12 has rasterized the image data (or a relevant portion thereof), the rasterized data is compressed by a compression stage 14. The compression can be accomplished using any known compression scheme such as run length coding or LZW compression. The first time the rasterized image data is presented to compression stage 14, it is preferable to utilize a lossless compression scheme. In order to accomplish this, a threshold input to the compression stage via line 20 is set to zero (Th=0).

Compression techniques are divided into two categories referred to as "lossless" and "lossy" techniques. Lossless techniques are reversible, whereas lossy techniques are irreversible. A much larger compression ratio can be achieved using lossy methods as compared to the lossless methods. However, the integrity of the decompressed data using a lossy technique is not as good as the decompressed data using lossless techniques, since some of the information will have been lost in the compression process.

In the initial lossless compression provided by compression stage 14, run length coding can be used wherein each scan line of the rasterized data is coded based on the number of consecutive pixels having the same color. This lossless run length compression can alternatively be performed within the RIP 12, in which case compression stage 14 would be used for subsequent compression steps as described below.

In implementing the lossless run length coding for the first round of compression, each group of adjacent pixels having the same color within the scan line is represented by a color identification and a number representing the number of consecutive pixels within a run of the same color. An example of such run length coding is illustrated in FIG. 3.

Figure 3:
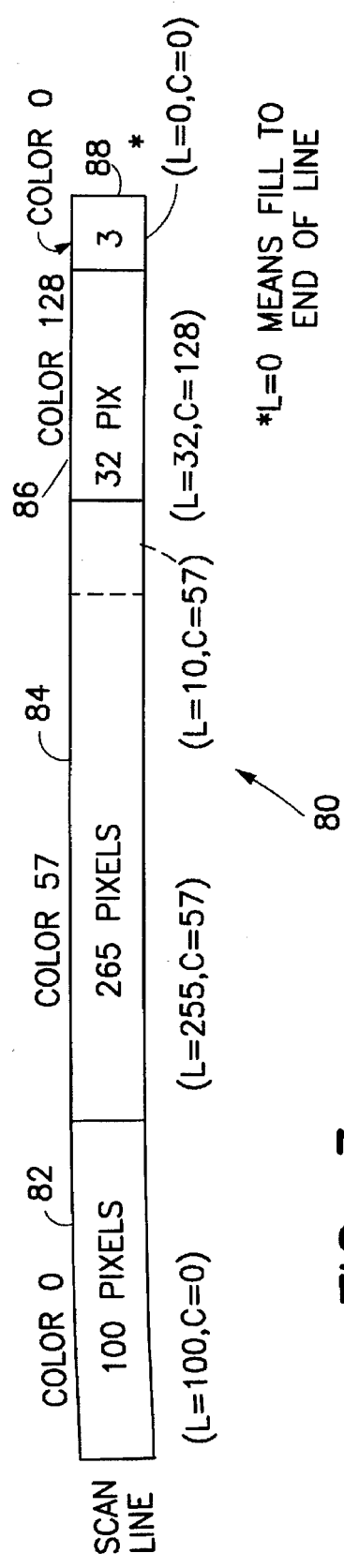
FIG. 3 is a diagrammatic illustration showing an example of lossless run length compression.

In the example provided in FIG. 3, scan line 80 is 400 pixels wide, and includes 100 consecutive pixels 82 of "color 0," 265 consecutive pixels 84 of "color 57," 32 consecutive pixels 86 of "color 128," and three consecutive pixels 88 of "color 0." Instead of storing all 400 pixels for scan line 80, the line is run length coded so that substantially less data is necessary to represent the entire line. In the example illustrated, the run length coding maintains a record of how many consecutive pixels are provided for each color represented in the line. Thus, the run length code for the scan length illustrated in FIG. 3 can comprise (L=100, C=0), (L=255, C=57), (L=10, C=57), (L=32, C=128), (L=0, C=0).

In the above representation, L is the number of consecutively colored pixels and C is the color for that "run" of pixels. Each of L and C can be represented by an eight-bit word. Since eight bits only define 256 possible values, it should be noted that the 265 pixel run (reference no. 84) of color 57 is represented in the run length code as a first run of length 255 and a second run of length 10. It should also be noted that the final run of consecutive same color pixels in each scan line is represented by the code L=0, which means that the scan line is filled to its end with the color represented by the final run length code for the line. It will be appreciated that other byte sizes and coding criteria could easily be substituted for the examples discussed above.

After the initial compression of an image (or portion thereof that is to be processed together), the amount of compressed data is evaluated in an evaluation stage 16 to determine whether it exceeds the available storage capacity of a memory (e.g., RAM 28) that is used to store the data prior to the generation of the image by imaging engine 32. If the evaluation stage 16 determines that the amount of data received from compression stage 14 will fit into RAM 28, it actuates switch 22 via line 18 to output the compressed data via line 24 for storage in RAM 28.

In the event that evaluation stage 16 determines that the compressed data will not fit into RAM 28, it actuates switch 22 via line 18 to feed the compressed data back to the input of the compression stage 14 via line 26. At the same time, evaluation stage 16 outputs a new compression threshold to compression stage 14 via line 20. The compression threshold can comprise, for example, a color proximity threshold indicating the extent to which different colors are to be run length coded as a single color during the next compression cycle. Run length coding on the basis of a color proximity threshold greater than zero (Th>0) represents lossy compression. Although some information is lost using such a compression scheme, the switch from lossless to lossy compression, while iteratively trying to reduce the amount of data to a point at which it will fit into RAM 28, enables complex images to be processed using less memory than would otherwise be required. At the same time, image quality is generally maintained at an acceptable, although somewhat reduced level.

Each time the data passes through compression stage 14, it is compressed with a more tolerant threshold until the amount of data output from compression stage 14 has been reduced to a level that will fit into RAM 28. Once this is determined by the evaluation stage 16, switch 22 is actuated via line 18 to output the compressed data into RAM 28 via line 24.

The data from RAM 28 is communicated to the imaging engine 32 via an interface 30. This interface can provide various functions, such as queuing the data, decompressing the image data, and providing various image processing functions to improve the image quality. The interface can also incorporate RAM 28, instead of the RAM being a separate component as shown in FIG. 1. An example of such an interface can be found in commonly assigned, copending U.S. patent application Ser. No. 08/298,410 filed on Aug. 30, 1994 and entitled "Interface for Providing Rasterized Data to an Imaging Device."

Figure 2A:
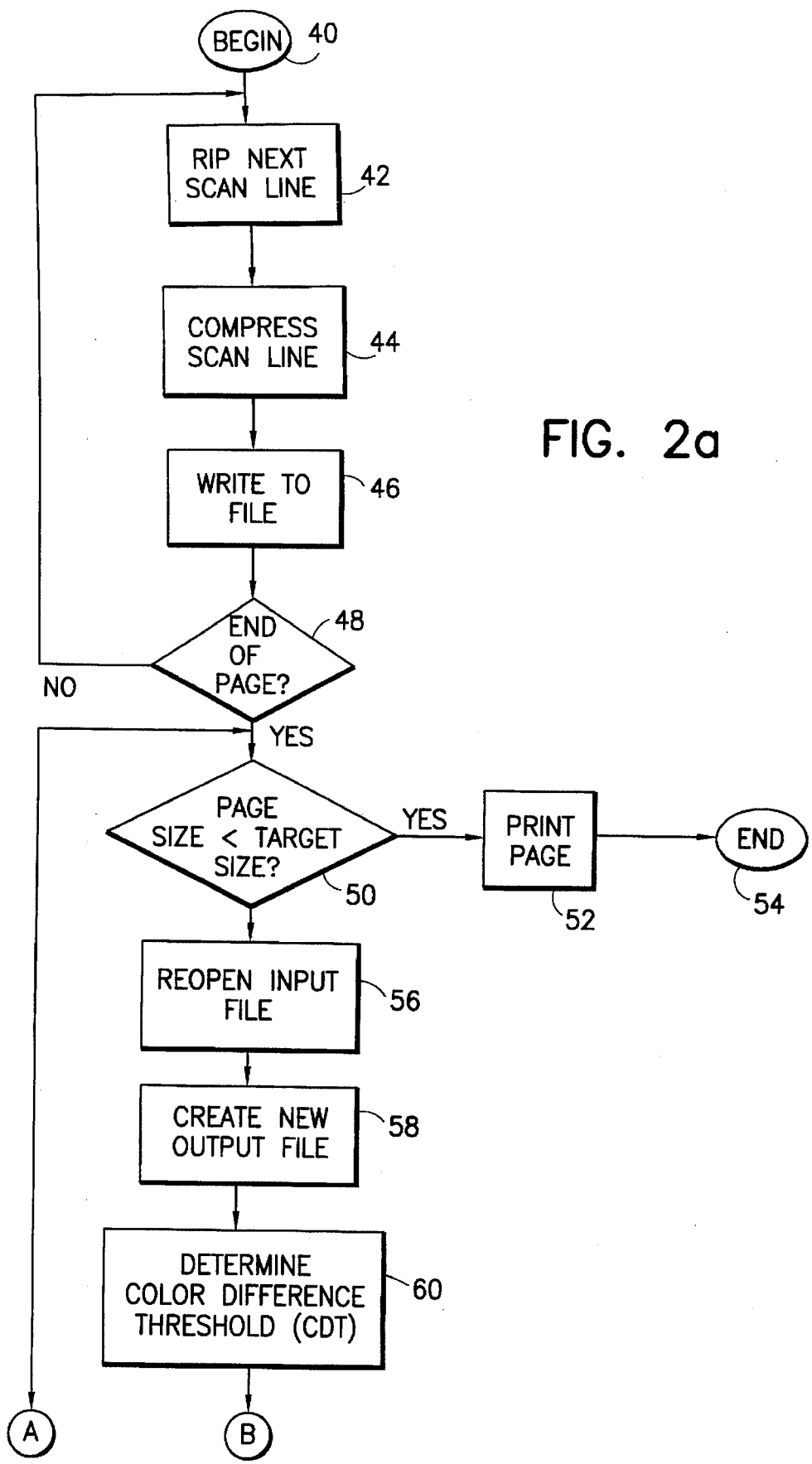
FIGS. 2a and 2b are a flowchart illustrating one possible implementation of the present invention.
Figure 2B:
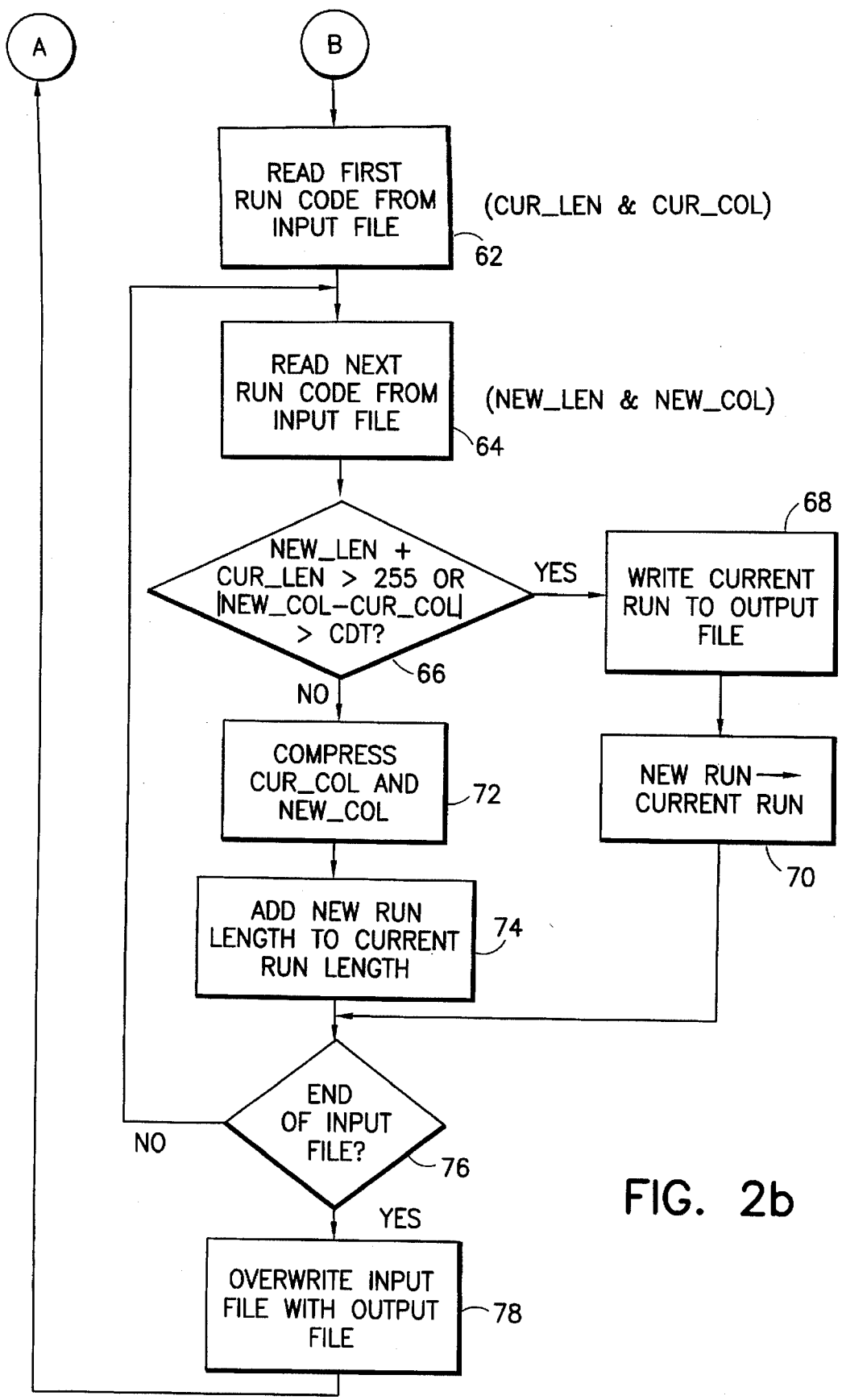

The flowchart of FIGS. 2a and 2b illustrates one implementation of the invention in which run length coding is used to provide the lossless and lossy data compression. The routine begins at box 40, and proceeds to box 42 where the next scan line in a graphic image file is rasterized. The rasterized scan line is compressed at box 44 (e.g., via lossless run length coding as illustrated in FIG. 3) and the compressed data is written to a file as indicated at box 46. At box 48, a determination is made as to whether all of the scan lines for a full page of image data has been processed. If not, the next scan line is RIPed at box 42 and the process continues until the full image has been rasterized and compressed. It is noted that an image can also be processed in portions, in which box 48 would determine that the end of a portion has been reached instead of the end of a page.

Once the image has been rasterized and initially compressed, a determination is made at box 50 as to whether the amount of the resultant data ("page size") is less than the "target size," which is the amount of data that can be stored in the available RAM. This determination is made at box 50, and if the page size is less than the target size, then the page will be stored in RAM and printed as indicated at box 52. The routine then ends at box 54.

If it is determined at box 50 that the current amount of image data is too great to fit within the available memory, the previously compressed graphic input file is reopened as indicated at box 56. Depending on the implementation, the "previously compressed" graphic input file can be the initial lossless run length coded data output from box 46, or the compressed data resulting from the immediately preceding compression step (which may be either lossless or lossy). Alternatively, each new compression iteration can be based on the original uncompressed data output from the RIP. In the preferred implementation, each lossy iteration step uses the results of the preceding lossless or lossy compression step. In this manner, a performance advantage is realized due to the smaller amount of data to be processed during each iterative pass. It is also possible to skip the lossless compression altogether and start with a lossy compression, particularly if it is known that only a limited RAM budget is available and the probability of fitting within this budget with lossless compression is low.

A new output file is created at box 58. At box 60, a new color difference threshold (CDT) is determined. The initial choice of the CDT can be implemented using a simple lookup table of compression ratios based on empirically observed results using typical images. For example, the initial threshold may cause colors that are within one shade of each other to be combined into a single color. On subsequent passes, the CDT is increased by some percentage, such as fifty percent. Eventually, the CDT will be large enough to obtain the desired compression ratio without excessive overshoot.

After the color difference threshold has been set, the first run code (or pixel, in the event the lossy compression steps revert back to uncompressed data) from the input file is read at box 62. This run code is referred to as the "current" run code and has a current length "CUR_LEN" and current color "CUR_COL." At box 64, the next run code from the input file is read. This run code is referred to as the "new" run code and has a length and color designated "NEW_LEN" and "NEW_COL," respectively. At box 66, a determination is made as to whether the sum of the new length and current length is greater than 255 pixels or whether the absolute value of the new color minus the current color is greater than the color difference threshold. The 255-pixel upper limit for the run length is specific to the illustrated implementation, and is not meant to limit the scope of the invention. This limit exists due to the fact that the illustrated implementation uses eight-bit run lengths, which can define a run of up to 255 pixels. Those skilled in the art will appreciate that a smaller maximum may be chosen to reduce visible compression artifacts in the resulting image, at the expense of the achieved compression ratio. For example, by limiting the run length of the lossy compression steps to a smaller number of pixels (e.g., 48 pixels), horizontal smearing of the resultant image can be reduced at the expense of color aliasing (due to the higher color threshold that will be required to achieve the necessary compression).

If combining two prior runs would result in a run length exceeding the maximum permitted value, or if the difference between the colors represented by the new and current run codes exceeds the CDT, the current run is simply written to the output file as indicated at box 68. Then, at box 70, the previous "new run" becomes the "current run."

A determination is made at box 76 as to whether the whole input file has been processed. If not, the next run code is read from the input file as indicated at box 64, and it is compared to the previous new run (now the current run) to determine if a combination of the new and current run would exceed the maximum permitted run length or the CDT. If not, then the current color and new color are compressed, e.g., by using the current color as the definition for both the current and new colors or by averaging the new and current colors together. Averaging the run colors together is optional. Less processing is required if the first run color of a pair is simply used, but this may result in undesired compression artifacts in the image.

After compressing the current and new colors at box 72, the new run length is added to the current run length, as indicated at box 74. The result is that two different colors are now represented as one color having the combined length of both.

After the whole input file has been processed as determined at box 76, the input file is overwritten with the output file as indicated at box 78. The output file is the file that has been created by run length coding the input file using the current color difference threshold. The overwriting can be achieved by simply renaming the output file on top of the input file, thereby deleting the old input file and replacing it with the new output file.

The routine then returns to box 50, where a determination is made as to whether the compressed data in the new output file is less than the target size required to fit within the available memory. If so, the page of the image will be printed as indicated at box 52, and the routine will end at box 54. If the page size still exceeds the target size, another compression iteration will be performed, this time using a more tolerant color proximity threshold in which colors that are more different from each other than permitted by the prior value of the threshold will be coded as a single color. By iteratively raising the CDT during successive compression cycles, the page size will be successively reduced and will ultimately fit within the available memory. It is noted that the target size must be chosen to be large enough so that the smallest possible run-encoded file will be less than the target size in order to avoid an infinite loop. The target size is typically chosen to be equal to the amount of RAM that is available for buffering an entire page during printing.

Figure 4:
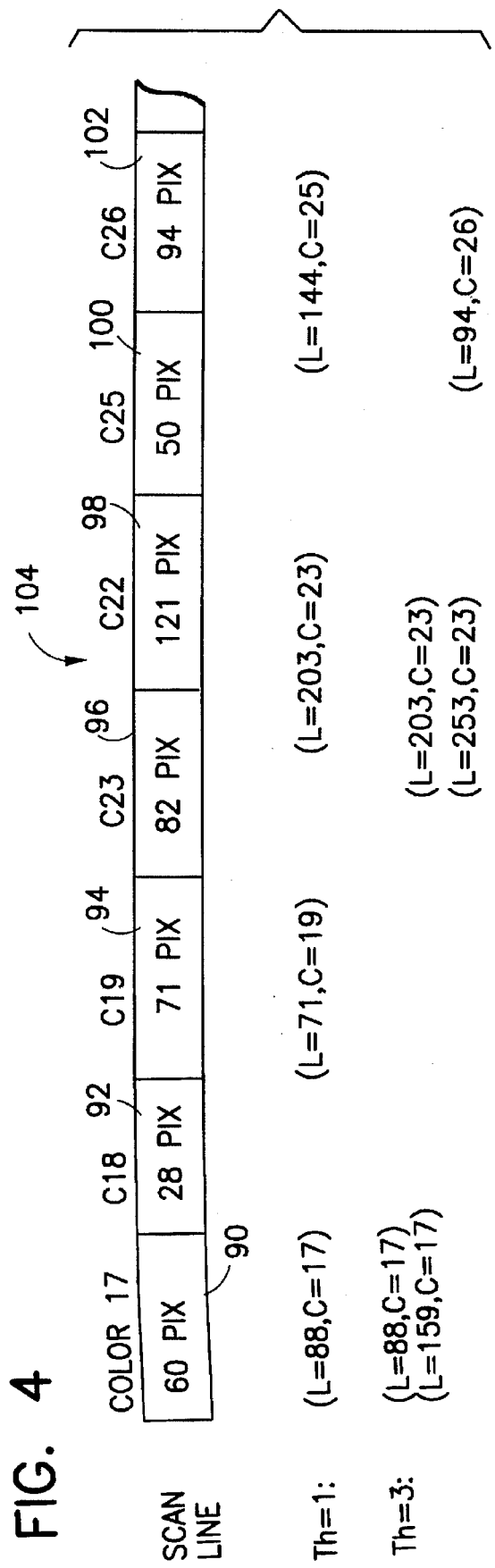
FIG. 4 is a diagrammatic illustration showing an example of lossy run length compression.

An example of the iterative run length coding in accordance with the present invention is illustrated in FIG. 4. A portion of a scan line generally designated 104 contains successive groups of pixels defining seven different colors. The first group of pixels 90 comprises 60 pixels ("pix") of color 17. The second group of pixels 92 comprises 28 pixels of color 18. If the color difference threshold is set to a color difference of one color (Th=1), then colors 17 and 18 will be run length coded into a single color. In the example illustrated in FIG. 4, the left-most color is chosen as the single color to describe two adjacent colors within the threshold. Thus, pixel runs 90 and 92 will be combined into a single pixel run having a length of 88 and color 17 (L=88, C=17). The processing of the scan line 104 will then proceed to pixel group 94, which contains 71 pixels of color 19. Since color 19 is more than one color away from color 17, which is the value of the previous run of pixels, pixel group 94 will not be combined with pixel groups 90 and 92. Thus, the coding of pixel group 94 will remain at length 71 and color 19 (L=71, C=19).

Processing then continues to pixel group 96, which represents 82 pixels of color 23. The following run is pixel group 98, which contains 121 pixels of color 22. Since color 22 is only one color away from the previous color 23, pixel groups 96 and 98 are within the threshold (Th=1) and will be combined as the single color 23 with a length of 203 pixels (L=203, C=23). Subsequently, pixel groups 100 and 102 will be combined since they are only one color apart. More particularly, pixel group 100 contains 50 pixels of color 25 and pixel group 102 contains 94 pixels of color 26. These two groups will be coded as a run of 144 pixels of color 25 (L=144, C=25).

If the amount of run length coded data that results from a CDT of Th=1 exceeds the amount of available memory, a new compression cycle is tried using a more tolerant threshold. For example, a threshold of three can be tried (Th=3), as also illustrated in FIG. 4.

A color difference threshold of three means that adjacent colors that are up to three colors apart will be combined into a single color. First, pixel groups 90 and 92 will be combined into a run code of 88 pixels of color 17 (L=88, C=17). Then, since pixel group 94 contains color 19, which is within three colors of color 17, this pixel group will be combined with the previous combined run of pixel groups 90 and 92. This will result in a run code of length 159, all of color 17 (the left-most color in the run). The resultant run code is (L=159, C=17).

Processing will then proceed to pixel group 96, which comprises 82 pixels of color 23. Since color is more than three colors away from color 17, pixel group 96 is not combined with pixel groups 90, and 94. Instead, processing will continue with pixel group 98 which comprises 121 pixels of color 22. Since colors 22 and 23 are within the threshold (Th=3), pixel groups 96 and 98 will be combined to provide a run of 203 pixels of color 23 (L=203, C=23). Processing continues with pixel group 100, which represents 50 pixels of color 25. Since color is within three colors of color 23, pixel group 100 is combined with already combined pixel groups and 98. The result is a run of 253 pixels of color 23 (L=253, C=23).

Processing then continues with pixel group 102. This group contains 94 pixels of color 26. Color 26 is within the threshold, because it is within three colors of color 23, which is the color to which pixel groups 96, 98 and 100 have been coded. However, the length of the combined groups 96, 98 and 100 is 253 pixels. If the 94 pixel length of pixel group 102 were added, the total run length would exceed 255 bits. As indicated above, this is not permitted where an eight-bit byte is used to represent the run length. Thus, pixel group 102 cannot be combined with the prior run code, and will remain simply as run code (L=94, C=26).

It should now be appreciated that the present invention provides an iterative process for compressing image data to a point at which it will fit within an available memory in an imaging system. Any type of image compression can be used. As is apparent from the above description, the invention is easily implemented using run length coding.

Although the invention has been described in connection with various specific embodiments, those skilled in the art will appreciate that numerous adaptations and modifications may be made thereto without departing from the spirit and scope of the invention as set forth in the claims.

We claim:

1. A method for compressing image data to enable the storage thereof in a limited amount of memory available in an imaging system, comprising the steps of:

(a) rasterizing said image data into a plurality of scan lines representing at least a portion of an image, each scan line comprising a sequence of pixels;

(b) compressing said scan lines in a first coding step which run length codes the data in each scan line to represent, in an abbreviated form, runs of colored pixel components which are grouped according to a group of pixels color proximity threshold;

(c) determining whether the amount of data contained in the compressed plurality of scan lines exceeds the available storage capacity of said memory, and if so, further compressing said compressed plurality of scan lines in a lossy second coding step to reduce the amount of data therein;

(d) ascertaining whether the amount of data remaining after said second coding step still exceeds the available storage capacity of said memory, and if so, successively repeating said second coding step such that said further compressed plurality of scan lines and, if necessary, subsequent generations of compressed data derived therefrom, are compressed until the amount of data remaining no longer exceeds the available storage capacity of said memory; wherein:

said second coding step comprises the steps of:

i) increasing said proximity threshold to encompass an increased range of colors;

ii) evaluating said runs of colored pixel components to locate any instances of two adjacent runs having respective different colors that fall within the increased proximity threshold; and (iii) upon finding such an instance, run length coding said two adjacent runs as a single run having a single color.

2. A method in accordance with claim 1 wherein said single color is an average of said respective different colors of said two adjacent runs.

3. A method in accordance with claim 1 wherein said single color is one of said respective different colors of said two adjacent runs.

4. A method in accordance with claim 1, wherein a maximum run length of said pixel runs of said second coding step is limited to control the quality of an image produced from the compressed scan lines.

5. A method in accordance with claim 1 wherein said first coding step uses lossy compression if the storage capacity of said memory is below a predetermined value.

6. Apparatus for compressing image data to enable the storage thereof in a limited amount of memory available in an imaging system, comprising:

means for rasterizing said image data into a plurality of scan lines representing an image, each scan line comprising a sequence of pixels;

first encoder means for run length coding said scan lines to represent, in an abbreviated form, runs of colored pixel components which are grouped according to a pixel color proximity threshold;

means for determining whether the amount of data contained in the run length coded scan lines for said image exceeds the available storage capacity of said memory;

means responsive to said determining means when said amount of data exceeds said available storage capacity, for increasing said proximity threshold to encompass an increased range of colors and evaluating said runs of colored pixel components to locate any instances of two adjacent runs having respective different colors that are within said increased proximity threshold;

second encoder means for run length coding said two adjacent runs as a single run having a single color upon finding such an instance;

means for ascertaining whether the amount of data output for said image after run length coding said two adjacent runs still exceeds the available storage capacity of said memory and adjusting means responsive to said ascertaining means when the data output still exceeds said available storage capacity, for further increasing said proximity threshold to emcompass a further increased range of colors such that subsequent run length coding of adjacent runs is based on the further increased proximity threshold;

wherein said second encoder means, in response to said adjusting means and said ascertaining means, uses successively increased proximity thresholds to run length code adjacent runs and, if necessary, subsequent generations of compressed data derived therefrom, until the data output for said image no longer exceeds the available storage capacity of said memory.

7. Apparatus in accordance with claim 6 wherein said single color is an average of said respective different colors of said two adjacent runs.

8. Apparatus in accordance with claim 6 wherein said single color is one of said respective different colors of said two adjacent runs.

9. A method in accordance with claim 1, wherein said plurality of scan lines represent substantially the entirety of said image.

* * * * *